United States Patent
Zheng et al.

(10) Patent No.: US 8,050,052 B2
(45) Date of Patent: Nov. 1, 2011

(54) EXPANSION BOARD RETENTION AND EXTRACTION MECHANISM

(75) Inventors: An-Sheng Anson Zheng, Guangzhou (CN); Michael T. Milo, Menlo Park, CA (US); Brett C. Ong, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 519 days.

(21) Appl. No.: 12/325,431

(22) Filed: Dec. 1, 2008

(65) Prior Publication Data

US 2010/0134988 A1   Jun. 3, 2010

(51) Int. Cl.
*H05K 7/14* (2006.01)
(52) U.S. Cl. ....... 361/802; 347/58; 360/254.2; 156/494; 439/160
(58) Field of Classification Search ............ 347/49, 347/86, 31, 58, 54, 85; 360/96.4, 92.1, 99.02, 360/254.2; 156/64, 288, 160, 229, 494; 439/64, 439/160; 312/332.1, 223.1, 265.6; 600/583, 600/584
See application file for complete search history.

(56) References Cited

U.S. PATENT DOCUMENTS

| | | | | |
|---|---|---|---|---|
| 5,309,325 A | * | 5/1994 | Dreher et al. | 361/754 |
| 2002/0048501 A1 | * | 4/2002 | Maclay | 414/111 |

* cited by examiner

*Primary Examiner* — Hung Duong
(74) *Attorney, Agent, or Firm* — Marsh Fischmann & Breyfogle LLP; Jonathon A. Szumny; Kent A. Lembke (57) ABSTRACT

An apparatus for applying a uniform retention and extraction force to a computer expansion board. The apparatus includes a body with upper and lower retaining members that define a retention channel between them sized to receive an edge of an expansion board. At each end of the catch body pins are provided that extend into a support structure, which is mounted to the computer chassis adjacent a mounting surface for the expansion board. A handle assembly is provided with arms pivotally mounted to the support structure. Each arm includes a dowel that extends into a groove in the catch body. During operation of the mechanism, a handle attached to the arms is moved to pivot the arms and force the catch body from an open position to a closed position with the side pins riding in the guide slots and the dowels riding in the grooves of the catch body.

20 Claims, 8 Drawing Sheets

EXPANSION BOARD RETENTION AND EXTRACTION MECHANISM

BACKGROUND

1. Field of the Invention

The present invention relates to an improved mounting mechanism for computer expansion boards and, in particular, to a device that can automatically retain and extract an expansion board within or from a computing device.

2. Relevant Background

Computing devices (i.e., servers, personal computers, and the like) are generally produced with an "open architecture" design to allow additional functions to be later added to the device. A motherboard on each computing device supports the main processing components and provides electrical connections to the motherboard and to ancillary components such as power supplies, disc drives, and the like. To add additional functionality to the computing device, expansion boards (also referred to as expansion cards, expansion modules, adapter cards, accessory cards, and so on) can be inserted into an expansion socket on the motherboard. Examples of expansion boards include but are not limited to graphics cards, sound cards, network cards, modems, and printer ports.

Expansion boards are printed circuit boards with one side or edge thereof including metal plated electrical connectors for mounting into a plug-in expansion board socket or other electrical connectors within the computing device. The plug-in expansion board socket typically includes spring-loaded contacts that mate with and retain the metal plated electrical connectors of the expansion board. To load the expansion card into an expansion socket in the motherboard, a user grasps the card and urges the connectors into the socket until the spring-loaded contacts are fully engaged with the edge connectors of the expansion board. Various types of clips and brackets are typically provided to try to restrain or stabilize the other or opposite side or edge of the expansion board. With horizontal expansion boards, the board is held in a horizontal orientation and pressed downward into the spring-loaded contacts, and clips and brackets are positioned at a number of locations about the edge to try to prevent the board from moving or excessively vibrating.

As computer systems have become more complex and space within servers and other computing devices has risen to a premium, expansion boards have become correspondingly denser with more components and circuitry being included on each expansion board. For instance, a blade server is an individual server having processors, memory, storage, network controllers, an operating system, and other components. Many blade servers can slide into a central chassis, which provides for high performance but also increased density. Also, the expanding use of lead-free solder creates weaker interconnects between the components on the expansion board. As a result of these and other design changes, expansion boards have become increasingly fragile and are highly susceptible to damage both during installation and removal of the boards. Additionally, the connectors on the expansion board often experience localized strain when a user is wiggling or flexing the expansion board to release the connectors from the spring-loaded contacts of the plug-in expansion board socket in the motherboard.

Hence, there remains a need for improved devices for mounting expansion boards within the box or chassis of a computer device such as a server. Preferably, such mounting devices would facilitate both installation and removal of the expansion board and would also provide a stabilizer to minimize risk of damage during movement of the computer device (e.g., during shipping or other movements that may cause the device and its boards to flex or vibrate).

SUMMARY

An apparatus or mechanism is provided for facilitating retention and extraction of expansion boards within a computer chassis such as within a server box. The mechanism includes a support assembly that is adapted for mounting to the computer chassis such as adjacent a mounting surface for the expansion board. The support assembly may have an elongated body with a pair of spaced apart (or inward facing) alignment/guide slots on opposing walls or other portions of the support assembly body. The mechanism also includes a board retention catch assembly with a body with a pair of alignment pins extending outward from opposite sides of the body and extending into the guide slots of the support assembly body. The board retention catch assembly may also include a pair of elongate retaining members extending parallel to each other on the body and defining a slot or channel therebetween, with this channel/slot adapted (sized and shaped) for receiving an edge of an expansion board. For example, the retaining members may be formed of plastic or rubber and be spaced apart a height or distance that is less than about the thickness of the board such that the expansion board is "press fit" into the channel or at least the retaining members abuttingly engage the upper and lower surface of the expansion board when it is inserted into the channel.

The mechanism may also include a handle assembly that is attached to the board retention catch body and operable to move the board retention catch body (and interconnected or integral retaining members) between a closed and an open position by applying a force to cause the alignment pins to move concurrently within the slots of the support assembly body. The slots of the support assembly body may each include a first portion extending substantially orthogonal to a mounting surface for the expansion board within the chassis when the mechanism is installed and also include a second portion extending from an of the first portion but at an angular offset (such as at least about 10 degrees from normal or the like). The first and second portions may be thought of as defining a travel path for the board retention catch body such that the retention channel is moved from a closed position (at a first height above the mounting surface) to an opened position (at a second height greater than the first height and also at a lateral location that is further spaced apart from the mounting location). In some cases, the board retention catch body may include an additional pair of the alignment pins such that two of such pins extend into each guide slot, and this may be desirable such that when the board retention catch body is moved between the closed and opened positions the body moves concurrently in vertical and lateral directions relative to the mounting surface (which causes a retained board to be pulled up and away from the mounting surface and, sometimes, also lifted up at an angle to expose an edge to allow the board to be pulled out of the retention channel).

The retention channel is useful for applying the mounting, retention, and extraction forces over a much larger area than was the case of clips and the like. To this end, in some embodiments, the retention channel may have a depth greater than about 0.2 inches and a length that is greater than about 50 percent of the length of the received edge of the expansion board, whereby any forces applied by the board retention catch assembly are spread over the length and depth of the channel and the abutting surfaces of the first and second (upper and lower) retaining members. The board retention catch body may also include a pair of elongated grooves or slots, and the handle assembly may include a pair of arms that are pivotally mounted to the support assembly body. Each of these arms may include a force-application member (e.g., a dowel, pin, protrusion, or the like) extending outward from the arm into the grooves, such that when the handle assembly is operated (such as by moving a handle attached to the two arms to cause them to move concurrently) by pivoting the arms forces are applied to the board retention catch body via mating surfaces between the grooves and the force-application members or dowels. The mechanism may also include one or more resilient members (e.g., springs or the like) that are arranged to apply a spring or similar force upon a surface of the board retention catch body to assist movement from the closed to the opened position and to resist movement from the opened to the closed position.

DETAILED DESCRIPTION

Briefly, a retention and extraction mechanism is provided for mounting within computer chassis or boxes to support installation, removal, and retention of an expansion board. The mechanism includes a board retention catch assembly with an elongate groove or slot between two elongate retaining members that is adapted for receiving an edge or side of an expansion board when the mechanism is in an open position. In such an open position, the groove/slot may face upward at an angle relative to horizontal (or relative to the mounting surface such as a motherboard or the like) such as at an angle of less than about 60 degrees and more typically less than about 45 degrees (e.g., up to about 15 to 30 degrees). The slot may have a height that is about the same size (or somewhat smaller) as the thickness of the board such that the board edge is press fit or snuggly received/retained within the groove when the board is inserted into the groove/slot (e.g., such that the edge or side of the board abuts the recessed surface of the groove). The combination of the length of the slot or space between the retaining members and the depth of the slot/groove creates a relatively large contact or retaining-force application area such that only relatively small forces need to be applied to the expansion board during installation, removal, and retention. In a closed position, the board retention catch is positioned such that the grasped expansion board is oriented horizontally relative to the mounting surface (or motherboard). A pair of alignment grooves may be provided in the body or support of the mechanism to receive one or more side pins on the board retention catch assembly to cause the retention catch assembly (or its retaining members and the slot therebetween) to rotate downward or toward the mounting surface, to move the board a distance laterally to place the board properly over the mounting surface or motherboard, and to move the board downward a vertical distance from the open position to the closed position of the mechanism to place the board into proper contact or connection to complete installation.

In general, the present inventors recognized that a mechanism was needed for facilitating toolless installation, removal, and replacement of an expansion board or module in various computing environments (e.g., in a blade server or the like) without causing damage to the various aspects of the expansion board and/or server. To this end, an installation mechanism is described herein that is mounted within a chassis or computer/server box that requires no tools for inserting and removing an expansion board. The installation mechanism includes a retention catch assembly or other gripping device formed of a relatively soft and resilient material such as rubber, plastic (e.g., a glass-filled plastic), or the like. The retention catch includes a gap or slot between a pair of retaining members that are spaced apart for receiving an end or edge of the expansion board. For example, the receiving slot or gap may have a width that is about the same or slightly smaller than the thickness of the board at its edge such that the board may be inserted into the slot and retained within the slot with a small amount of force along the length of the mating union or junction between the retention catch assembly and the board edge.

The retention catch is used to mount the expansion board to an interconnected elongated body, which is rigidly attached to the chassis or motherboard of the computing environment. An ergonomic handle with manipulation arms is mounted to the elongated body and allows a user to easily plug and unplug an expansion board from electrical sockets on the motherboard by moving the retention catch from the open position to the closed position in which the retaining members apply a relatively uniform insertion force or pressure along the board edge. The retaining members (and/or the back wall of the slot when the board is pressed into the slot to abut the retaining catch) also apply a retaining force along the contacting surface area of the edge of the board when the board attempts to move (e.g., if the computer chassis/box is dropped or shaken during shipping, installation, or the like). The installation mechanism (or board retention/extraction mechanism) includes a spring-loaded feature that facilitates the ejection, unplugging, or unloading of the expansion board from the socket or sockets on the motherboard with the retention catch being moved from a closed position in which the retaining members are positioned at a first vertical distance relative to the motherboard/chassis and at a first horizontal position relative to the connectors of the motherboard to an open position in which the retaining members are positioned a second vertical distance relative to the motherboard and a second horizontal distance relative to the connectors of the motherboard. The second distances are both greater than the first distances such that the board is moved upward when the installation mechanism is opened and also horizontally away from the connection location on the motherboard/chassis, e.g., providing automatic ejection/release of the board. The retention catch essentially moves in at least two dimensions during movement between the closed/open positions to the open/closed position. In one embodiment, an alignment feature works in conjunction with the manipulation arms and the spring-loaded feature to position the retention catch and a retained/captured expansion board at an angle above horizontal (e.g., an angle to greater than about 15 degrees) for easy mounting to or removal from the toolless installation mechanism (e.g., with the opening or slot between the retaining members being angle upward to receive the edge of the board).

The mechanism is user-friendly and of compact design which allows for use in space-constrained environments. The board retention/extraction mechanism also does not require the use of tools to install or remove the expansion board as the user/installer simply has to use the handle to open and close the retention catch. The offset design of the manipulation arms provides a mechanical advantage for a user when moving the handle from a closed to an opened position. Additionally, the device provides robust retention of the expansion board because of the even application of pressure along at least one edge of the expansion board during installation, removal, and retention (e.g., during an event causing the board to try to move horizontally or vertically relative to the chassis or motherboard). The retaining forces are spread over a relatively large surface area as the retaining members generally are elongate members that provide a force-application or contact surface area that extends a substantial portion of the board edge. For example, in one embodiment, the contact/retention surface area is over half of the length of the board edge and the slot/gap has a depth of 0.1 to 1 inch to provide a contact/retention surface area with a depth of at least 0.1 inches to about 0.5 inches or more, which provides a large area to apply retention forces or pressure rather than all the retention force being applied at point locations as was the case with clips and other retainers that led to board and component strain and damage.

Figure 1:
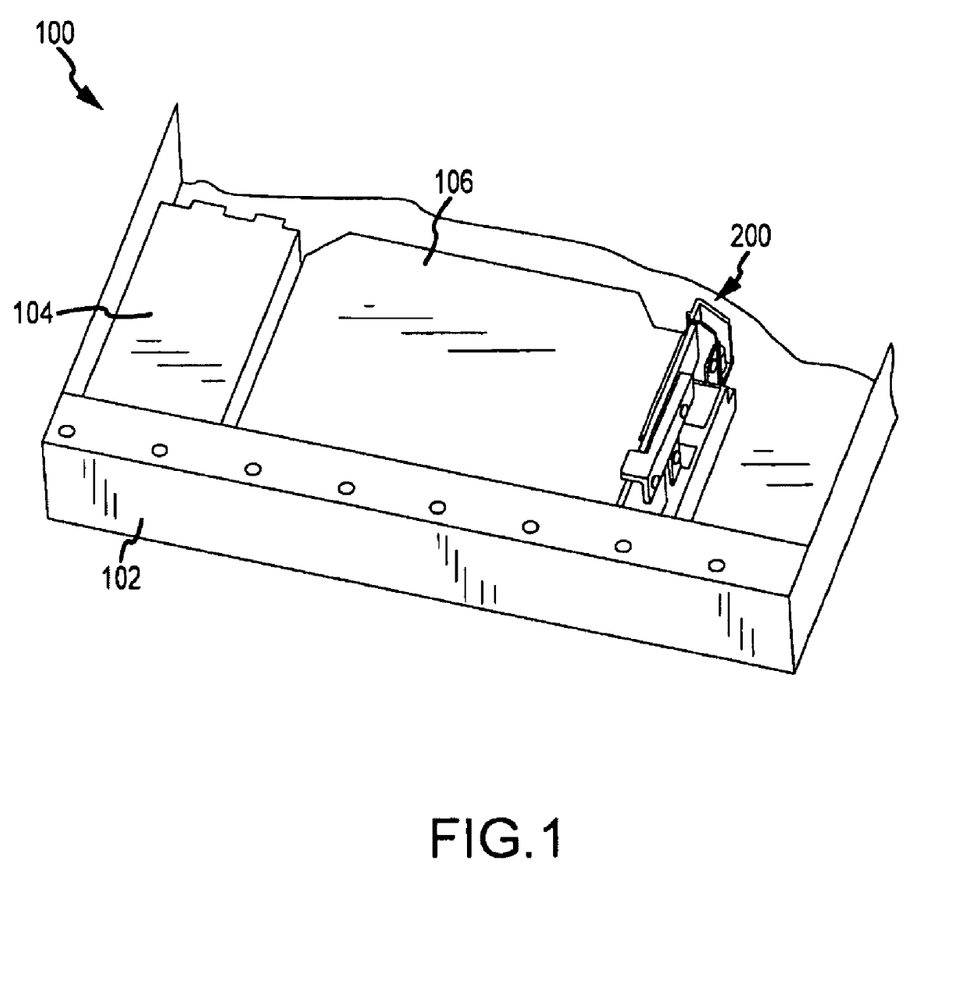
FIG. 1 is a perspective view of a computer device such as a server or the like with the cover removed from the chassis to show an expansion board mounted and retained in place with an expansion board retention/extraction mechanism of an embodiment of the invention.

Turning now to the figures, FIG. 1 illustrates a perspective view of one embodiment of a quick-release mechanism 200 that is adapted for facilitating installation, extraction, and retention of expansion boards. The mechanism 200 is shown mounted within a server 100 and retaining an installed expansion board 106 (i.e., the mechanism 200 is shown in the closed position). For clarity, not all traditional components of the server 100 have been shown. The server 100 can be a conventional design and generally includes a chassis 102, hard drive 104, at least one processor, memory, vertical expansion boards, and the like (not all components shown or labeled for ease of illustration). Further, the server 100 includes at least one horizontal expansion board 106 for adding increased functionality to the server 100. It will be appreciated that many parts of the server 100 including the vertical and horizontal expansion boards can be hot swapped to provide the capabilities and functionality desired by a particular user or users. Horizontal expansion board 106 generally includes connectors on the underside thereof (not shown) for mating with spring-loaded sockets (not shown) on the chassis 102 or motherboard of the server 100. Additionally, as will be more fully described below, quick release mechanism 200 provides even application of pressure along the edge of an expansion board 106 to retain the board 106 in place so as to provide increased support and stability of the horizontal expansion board 106 when the server 100 is moved or shifted or even dropped. Such even application of forces is achieved, as is discussed below, by a relatively large contact or interaction surface(s) between the board 106 and the mechanism 200 (e.g., an elongate rectangular surface area on the top and bottom of the board surface near the edge as well as, in some cases, the side wall or edge itself that may abut the mechanism 200).

Figure 2:
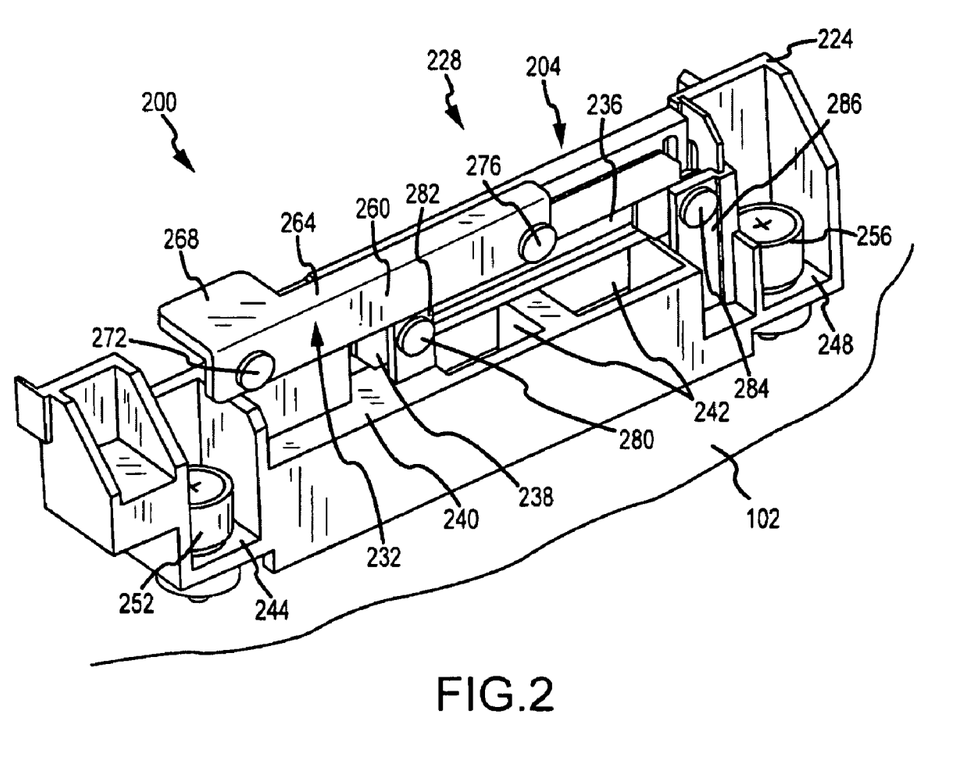
FIG. 2 is a rear perspective view of the retention/extraction mechanism of FIG. 1 mounted to the chassis or motherboard of the server in a closed position, with no expansion board shown for ease of illustration.

FIG. 2 illustrates a rear perspective view of the quick release mechanism 200 mounted to the chassis 102 or to/near a motherboard of the server 100. The quick release mechanism 200 broadly includes an elongated body or support 224 having first and second mounting zones 244, 248 and a loading assembly or recessed surface 228. The loading assembly 228 includes a board retention catch mechanism or assembly 204 for receiving the horizontal expansion board 106 (not shown in FIG. 2) within the loading assembly 228 of mechanism 200. The first and second mounting zones 244, 248 include bores (not shown) that accept respective first and second fasteners 252, 256 for mounting the quick release mechanism 200 to the chassis 102 or motherboard of the server 100. The loading assembly 228 is adapted to retain/support and position the board retention catch 204 and a horizontal expansion board 106 received within the board retention catch 204 relative to a mounting surface within a server chassis/box such as relative to a plurality of connectors on a horizontal motherboard or the like. In general, when the quick release mechanism 200 is in a closed configuration as shown in FIG. 2 and a horizontal expansion board 106 is received by board retention catch 204, the electrical connectors on the underside of the horizontal expansion board 106 will be fully mounted to the spring loaded expansion sockets of the chassis 102 or motherboard (not shown) of the server 100.

The loading assembly 228 generally includes a handle 232, first manipulation arm 236, second manipulation arm 238, and a platform 240 on the body/support 224 that are adapted to support the board retention catch assembly 204 and position and/or retain the horizontal expansion board 106 (e.g., when the mechanism 200 is in the closed position). Handle 232 includes a first portion 260, second portion 264, and a finger catch 268 extending from the second portion 264. The first portion 260 of the handle 232 is pivotally mounted to the first and second manipulation arms 236, 238 by a first pin 272 and a second pin 276. Further, the first manipulation arm 236 and second manipulation arm 238 are respectively mounted to a first upstanding tang 282 and a second upstanding tang 286 of the body 224 by a third pin 280 and a fourth pin 284. As will be later discussed in more detail, a user simply grasps and lifts handle 232 vertically or generally in a direction away from the body 224 of the quick release mechanism 200 in order to lift board retention catch assembly 204 from the platform 240 of the loading area 228 and release horizontal expansion board 106 from the spring loaded sockets (not shown) on a motherboard or other mounting surface of a server or other computer device. As shown in FIG. 2, the platform 240 can include a plurality of openings 242 to provide for weight reduction in addition to providing airflow to cool heat producing components in the server 100.

Figure 3:
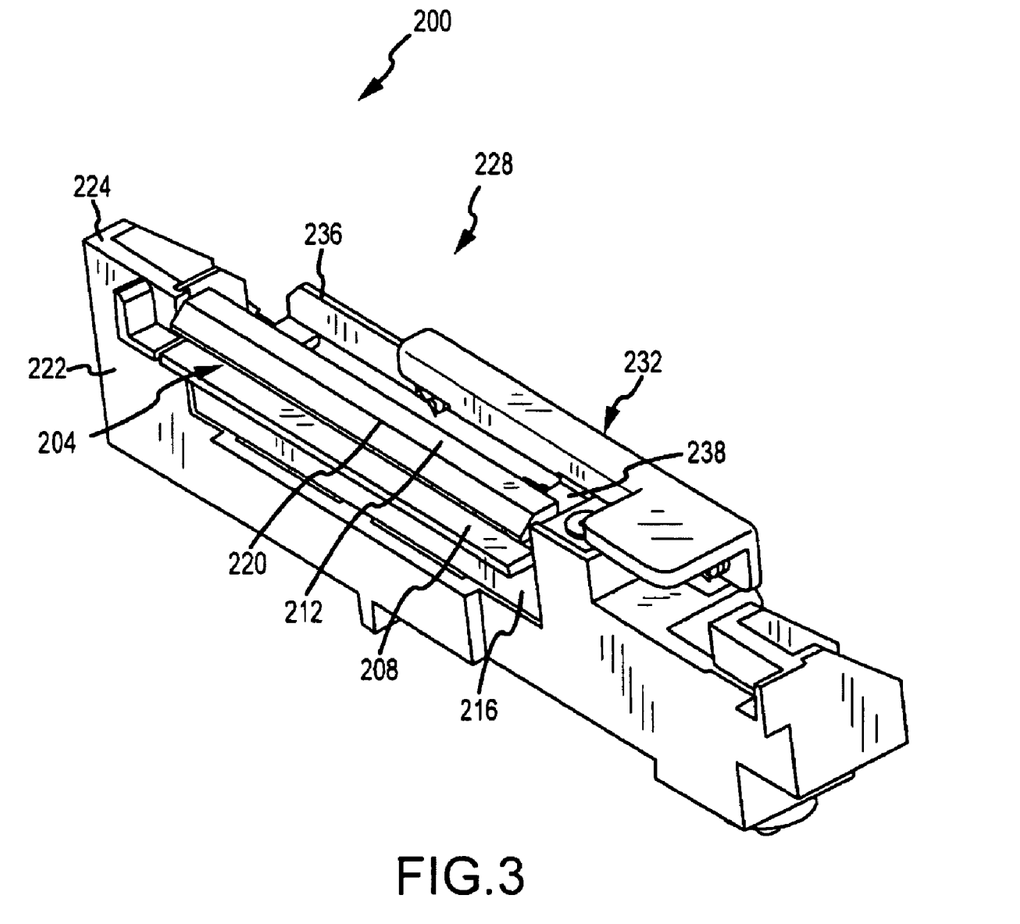
FIG. 3 is a front perspective view of the quick release mechanism of FIG. 1 in a closed configuration and more fully illustrating the board retention catch.

FIG. 3 is a front right perspective view of the quick release mechanism 200 in a closed configuration/position and more clearly illustrates the board retention catch assembly 204 used to support the horizontal expansion board 106 within the quick release mechanism 200. The board retention catch 204 includes head member (or a first or upper retaining member) 212, shelf (or a second or lower retaining member) 208, base or body member 216, and a retention slot or gap 220 located or formed between head member 212 and shelf 208. At least the retaining members 208, 212 are formed of a flexible material such as a glass-filled plastic or the like such to facilitate receiving and retaining an expansion board (e.g., with a snug or even a press fit while only applying a relatively small amount of pressure). The retention slot 220 is generally situated on a front side of the board retention catch 204 with the front side being located opposite a back side and between first and second lateral sides and top and bottom sides (the various sides are not labeled) and oriented to be facing or proximate to the mounting surface (or motherboard) when the mechanism 200 is mounted within a computer chassis or box. Again, the slot 220 is typically sized with a width or height (e.g., the spacing between members 208, 212) that is about the same as or somewhat smaller than the thickness of the expansion board 106. The slot 220 also has a length defined by the lengths of the members 208, 212 that is typically a significant fraction of the length of the expansion board side or edge received in the slot 220 such as at least about 50 percent of the expansion board side length or more (e.g., about 70 to 80 percent of this board dimension), and, in some embodiments, the slot is at least about 3 inches in length but this dimension will vary to suit the size of the board. Also, the length of the slot 220 when combined with the depth of the slot 220 (or engagement between the upper member 212 and the board edge) defines the contact area for applying an installation/mounting force, a retention force after board installation, and a removal force during removal/extraction of a board 106. Hence, the slot depth (as measured from a front edge/lip of the upper retention member 212 to a back wall of the slot provided by body 216) is typically at least about 0.1 to 0.25 inches and may be much larger such as 0.5 to 1 inches or more to suit the size and weight of the supported expansion board 106 and to effectively distribute application of forces to avoid damaging the board 106. Before mounting the electrical connectors on the underside of the horizontal expansion board 106 into the spring loaded sockets on the motherboard and before board retention catch 204 is moved into a closed position against a platform 240 of elongate body/support 224 platform 240 being shown in FIG. 4), a user will insert one edge of the horizontal expansion board 106 into the retention slot 220 of the board retention catch 204 (e.g., so as to abut a back wall and, in some cases, to be retained by a pressfit with both members 208, 212 applying a light squeezing pressure over the relatively large contact/force-application area). Hence, even in the open position of the mechanism 200, the retention slot 220 is adapted to exert a slight gripping pressure on an edge of the horizontal expansion board 106 to retain the horizontal expansion board 106 within the board retention catch 204. During use of mechanism 200, the user operates the loading assembly 228 by lifting handle 232 into an open configuration/position as shown in FIGS. 4-8, insert a board (such as board 106), and then loading or moving the retention catch 204 against the platform 240 of the body 224. Finally, the user will push handle 232 into a closed configuration until the bottom side of the board retention catch 204 abuts or is adjacent to platform 240 as is shown in FIG. 3 (and a locking latch or catch may be provided to hold the handle 232 in this closed position). As the handle 232 and first and second manipulation arms 236, 238 are moving into the closed configuration, the electrical connectors on the underside of the horizontal expansion board 106 will be inserted into the spring loaded sockets on the motherboard to fully retain and lock the horizontal expansion board 106 to the chassis 102 of the server 100. Quick release mechanism 200 also includes a support tab or recessed surface 222 on body 224 that is generally at the same vertical level as is the shelf 208 of the board retention catch 204. Support tab 222 provides additional support for a horizontal expansion board 106 having a side or edge with a width or length greater than that of the retention slot 220 of the board retention catch 204.

Figure 4:
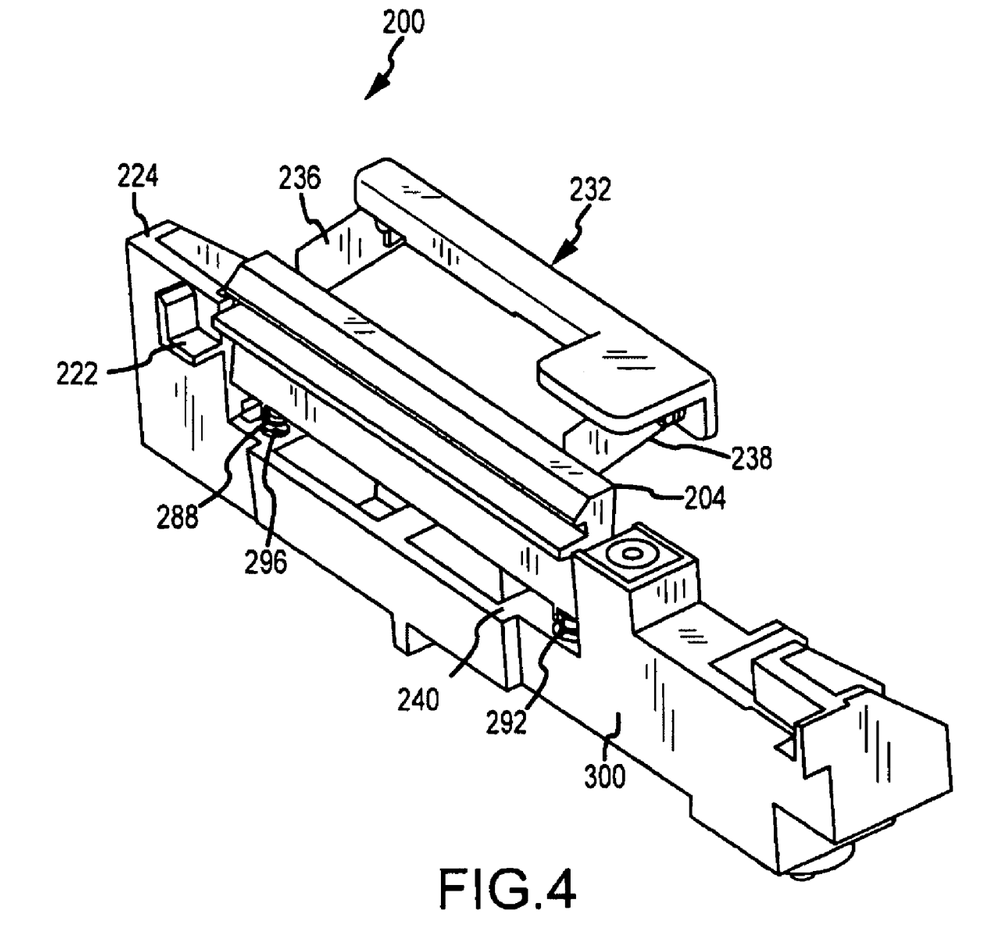
FIG. 4 is a front perspective view of the quick release mechanism of FIG. 1 in an open configuration and showing the board retention catch in a loading or angled configuration.
Figure 5:
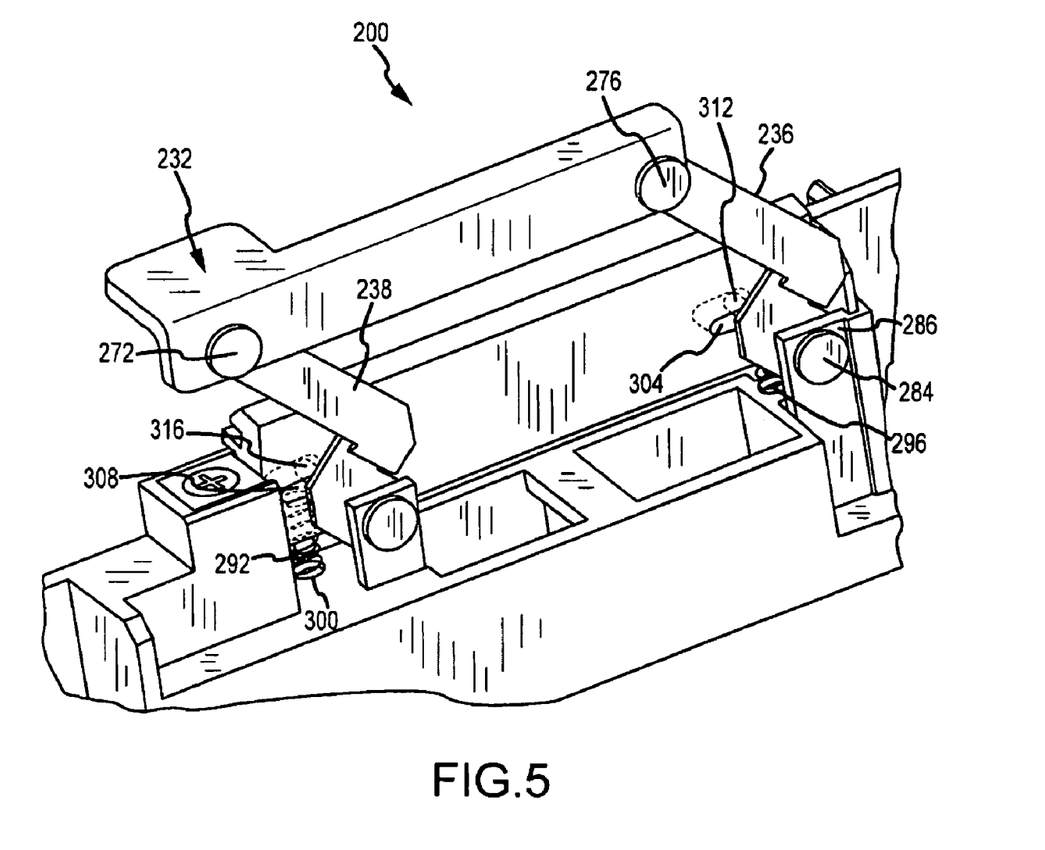
FIG. 5 is a rear perspective view of the quick release mechanisms of FIG. 1 in an open configuration and showing the board retention catch in a loading or angled configuration.
Figure 6:
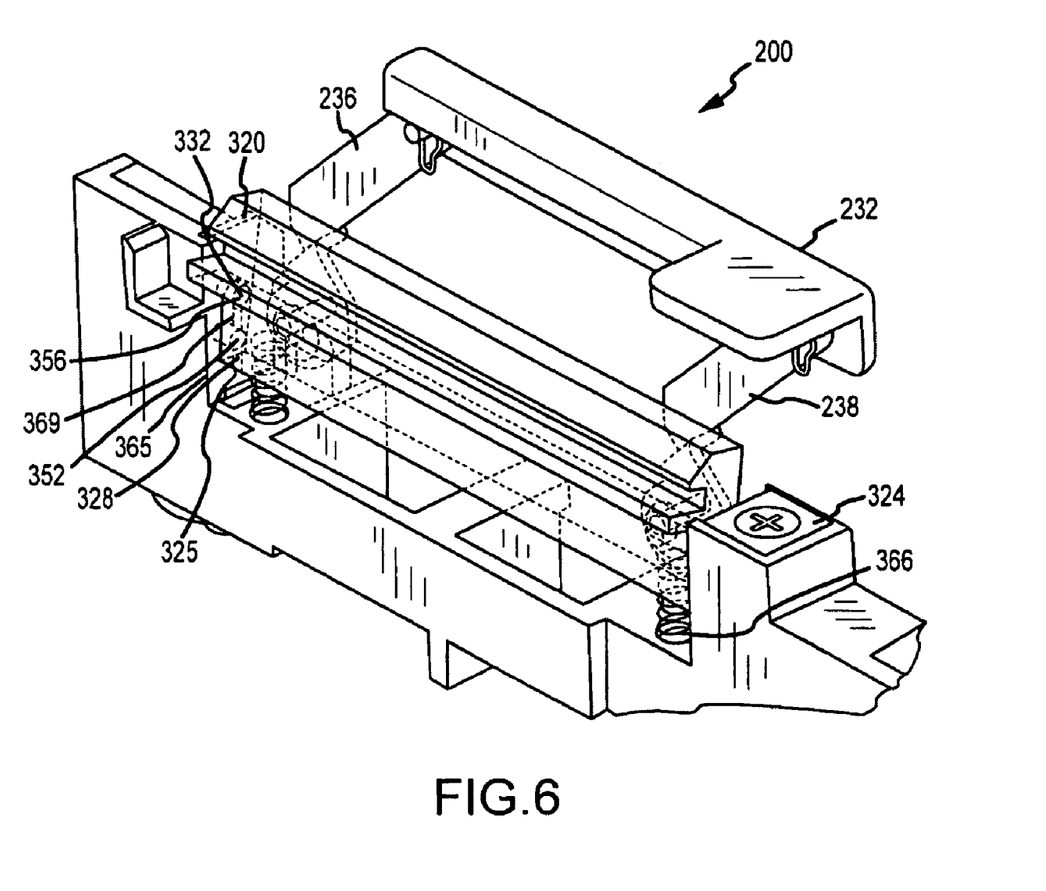
FIG. 6 is a front perspective view of the quick release mechanism of FIG. 1 in an open configuration and showing the board retention catch in a loading or angled configuration.

FIGS. 4-6 illustrate the quick release mechanism 200 in an open configuration and show a more detailed view of the loading assembly 228. With respect to FIG. 4, the handle 232 is shown after it has been lifted into the open configuration or position exposing first manipulation arm 236 and second manipulation arm 238, and retention catch 204 has been moved to an angled or loading position thus allowing for easy removal or loading of horizontal expansion board 106. More specifically, when the retention catch 204 is in the angled position, the front and back sides are generally angled relative to the platform 240 (and a mounting surface/board within the computer chassis/box), and while when the retention catch 204 is in the closed or loaded position as in FIGS. 1-3, the front and back sides are generally perpendicular to the platform 240. Platform 240 includes one or more components that apply a force (e.g., a vertical or upward force) on the body 216 of the retention catch assembly 204 that resists movement into a closed position but, more significantly, assists in evenly applying a force during extraction or board removal that urges the body 216 off of or away from the platform 240. In the illustrated embodiment, the "extraction assist" components or assembly includes at least a pair of springs 296, 300 for mating with a corresponding pair of pegs 288, 292 attached to the bottom side of and extending generally perpendicularly from the board retention catch 204 (with the pegs 288, 292 along with optional recessed surfaces in body 224 maintaining springs 296, 300 in position within the mechanism 200). It will be appreciated that the springs 296, 300 and pegs 288, 292 can be respectively attached or mounted to the platform 240 and the underside of the board retention catch 204 in any manner known in the art including without limitation molding, welding, adhesives, and the like. After a user has mounted the horizontal expansion board 106 into the retention slot 220 of the board retention catch 204, the user will position the pegs 288, 292 into the springs 296, 300. Thereafter, by a process that will be described below, when the user pushes handle 232 in a direction generally towards the body 224 of the quick release mechanism 200, the first and second manipulation arms 236, 238 (or pegs or members extending outward from the arms 236, 238 to contact the catch 204) will force the board retention catch 204 and horizontal expansion board 106 generally towards the platform 240 of the body 224. Once the board retention catch 204 and horizontal expansion board 106 have been moved to a position either adjacent to or in contact with the platform 240, the connectors on the underside of the horizontal expansion board 106 will or should be engaged with the expansion board sockets of the motherboard or chassis 102. Alternatively, the pegs 288, 292 could be located on the platform 240 and the springs 296, 300 could be located on the bottom side of the board retention catch 204 without departing from the scope of the present invention. Additionally, more or fewer pegs and springs could be utilized with the quick release mechanism 200 to suit various user preferences.

At this point, the springs 296, 300 will be compressed creating a biasing force against the bottom side of the board retention catch 204 for later assisting in ejection of the retention catch 204 from the quick release mechanism 200. However, unless a user lifts handle 232, the biasing force created by the springs 296, 300 will not overcome the resistance created by the interaction of the connectors on the underside of the horizontal expansion board 106 and the spring-loaded expansion board sockets mounted to the motherboard or chassis 102 or a retention force provided by a latch or catch (not shown) that is mounted on the body 224 and contacts the handle 232. It will be appreciated that a variety of springs exerting various levels of force can be utilized with the quick release mechanism 200, so long as the springs do not overcome the resistance created between the connectors on the underside of the horizontal expansion board 106 and the spring-loaded expansion sockets on the motherboard or chassis 102 when the handle 232 is in the closed configuration.

An open configuration of the quick release mechanism 200 from a rear perspective is shown in FIG. 5. As can be seen, first manipulation arm 236 and second manipulation arm 238 respectively include a first dowel 312 and second dowel 316. Correspondingly, the back side of board retention catch 204 includes a first elongated slot 304 and second elongated slot 308 (e.g., a horizontal slot when the mechanism 200 is installed). When operating the loading assembly 228 to load or move the board retention catch 204 against the shelf 240 of the quick release mechanism 200, the first and second pegs 288, 292 will move further into or vertically downward within the first and second springs 296, 300 while the first and second dowels 312, 316 move laterally or horizontally within the first and second elongated slots 304, 308. Thus, when a user pushes handle 232 from an open configuration shown in FIG. 5 to a closed configuration as shown in FIGS. 2-3, the first dowel 312 and second dowel 316 will respectively slide in the first elongated slot 304 and the second elongated slot 308. Concurrent with this lateral movement, the arms 236, 238 and handle 232 are moving vertically downward or toward the mounting surface, and, hence, the dowels 312, 316 act to apply a downward driving force against the board retention catch 204 in a direction generally normal to the platform 240 of the body 224 of the quick release mechanism 200 and to the mounting surface within the computer chassis/box. Such a downward or normal force will drive the body 216 of the board retention catch 204 to a position in contact with or adjacent to the platform 240 and simultaneously compress first and second springs 296, 300 between the bottom side of the board retention catch 204 and the platform 240. The board retention catch 204 and horizontal expansion board 106 are now in a closed or loaded position.

As previously discussed, compression of the first and second springs 296, 300 creates potential energy within first and second springs 296, 300 for later assisting in the ejection of the board retention catch 204 when a user lifts handle 232 away from the body 224 of the quick release mechanism 200. Ordinary artisans will recognize that the first dowel 312 and the second dowel 316 can be respectively attached or mounted to the first and second manipulation arms 236, 238 including without limitation by welding, molding, screwing, and the like. Further, while only two dowels and two elongated slots have been shown, fewer or additional dowels and elongated slots or dowels and elongated slots of various shapes and configurations can be utilized with the quick release mechanism 200. Alternatively, the first and second dowel 312, 316 could instead be mounted to the board retention catch 204 while the first and second elongated slots 304, 308 could alternatively be located within the first and second manipulation arms 236, 238 without departing from the spirit of the invention.

Figure 7:
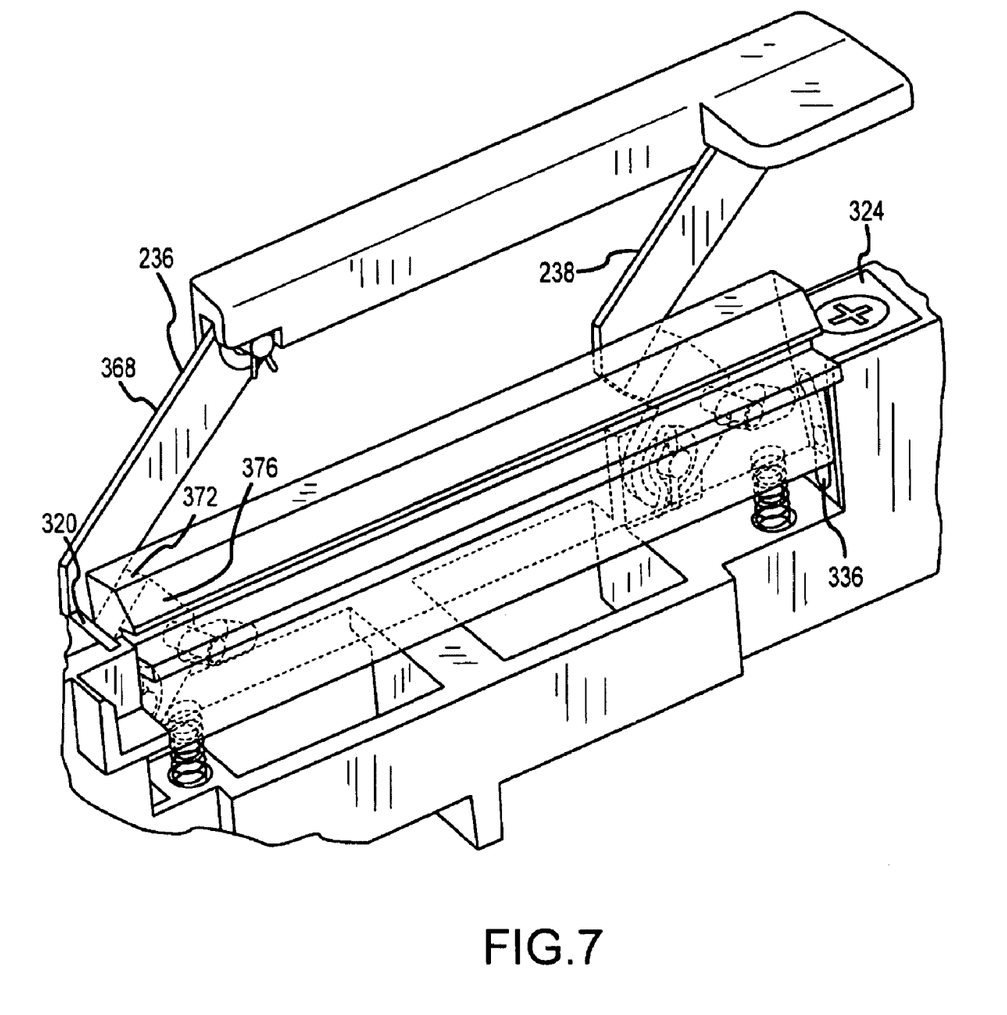
FIG. 7 is another front perspective view of the quick release mechanism of FIG. 1 similar to FIG. 6 but from a different angle.
Figure 8:
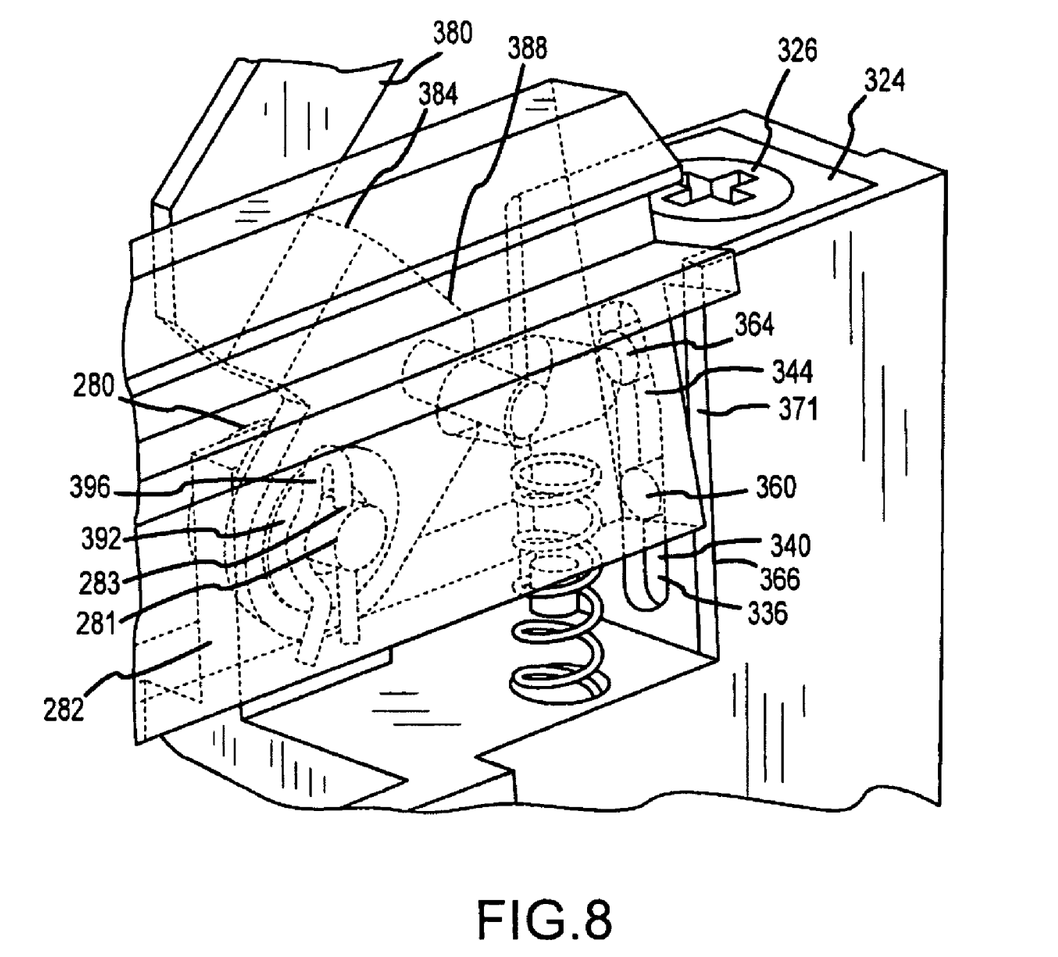
FIG. 8 is another front perspective view of the quick release mechanism of FIG. 1 similar to FIG. 7 and clearly illustrating the connection assembly between the body and one of the manipulation arms of the quick release mechanism.

With respect to FIGS. 6-8, front perspective views of the quick release mechanism 200 in an open configuration or position are illustrated. An alignment arrangement or components/assembly of the quick release mechanism 200 allows for convenient removal of the horizontal expansion board 106 from the board retention catch 204 once the handle 232 is moved to the open position. The alignment arrangement exerts a torque on the board retention catch 204 as the handle is lifted from the closed to the open configuration to position the board retention catch 204 and horizontal expansion board 106 at an angle convenient for removal or replacement. More specifically, the loading assembly 228 of the quick release mechanism 200 includes a first alignment device 320 and a second alignment device 324. As most clearly seen in FIG. 6, the first alignment device 320 generally includes a body with a first elongated alignment slot 325 therein. The first aliment device 320 is shown as being fit into a correspondingly shaped slot (not labeled) within the body 224 of the quick release mechanism 200 and can be rigidly attached to the body 224 in any way known in the art including without limitation adhesives, molding, and the like. The first elongated alignment slot 325 includes a first portion 328 and a second portion 332. The first portion 328 is generally arranged vertically and perpendicularly to the platform 240 (and a mounting surface/board within a computer chassis/box), and the second portion 332 is angled relative to the first portion 328 and generally extends from a top of the first portion 328 towards the back of the body 224 or in a direction toward the handle 232 (e.g., if the angle is measured from a line extending from the substantially vertical portion the angle would typically range from a few degrees up to 30 to 45 degrees or more or, in other words, the second portion 332 may be thought of as providing a linear path angled away from normal to the mounting surface by about 5 to 30 degrees or more). With respect to FIG. 8, second alignment device 324 generally includes a body mounted to a correspondingly shaped depression (not labeled) in the elongated body 224 of the quick release mechanism 200, e.g., may be rigidly attached to the body 224 by a screw 326. Similarly, the second alignment device 324 includes a second elongated alignment slot 336 that has a first portion 340 and a second portion 344. The first portion 340 is generally arranged vertically such as perpendicularly to the platform 240 (and a mounting surface for a received expansion board), and the second portion 344 is angled relative to the first portion 340 and generally extends from a top of the first portion 340 and toward the back of the body 224 or in a direction toward the handle 232 (e.g., similar to or parallel to the travel paths defined by the first alignment device 320).

Continuing to refer to FIGS. 6 and 8, the left lateral side of the board retention catch 204 includes first and second slide pins 352, 356 and the right lateral side of the board retention catch 204 includes third and fourth slide pins 360, 364. The first and second slide pins 352, 356 are adapted to slide within the first elongated alignment slot 325 and the third and fourth slide pins 360, 364 are adapted to slide within the second elongated alignment slot 336. The first, second, third and fourth slide pins 352, 356, 360 and 364 may be spring-loaded pins that extend within the board retention catch 204 when retracted and protrude from board retention catch 204 when extended or may be rigid pins or extending members/elements. While not shown, first and second corner edges 365, 366 of the body 224 of the quick release mechanism 200 can be beveled. Such beveled corner edges 365, 366 assist a user in inserting the board retention catch 204 during assembly by facilitating the retraction of the first, second, third and fourth slide pins 352, 356, 360, 364 within the board retention catch 204 and subsequent extension of the first, second, third and fourth slide pins 352, 356, 360, 364 within the first and second elongated alignment slots 325, 336. Additionally, first edges 369, 371 of the first and second elongated alignment slots 324, 336 can also include beveled edges to assist in the removal of the board retention catch 204 during disassembly.

It will be appreciated that the first, second, third and fourth slide pins 352, 356, 360, 364 can alternatively include flexible pins such that the pins deform or flex as the user inserts board retention catch 204 into the loading assembly 228, and then regain their original shape once the pins enter the first and second elongated alignment slots; the pins similarly deform or flex upon removal of the board retention catch 204 from the loading assembly 228 of the quick release mechanism 200. Further, ordinary artisans will recognize that although this embodiment has been shown with the slide pins being located on the retention catch 204 and the alignment slots being located on a portion of the body, the slide pins could instead be located on the portion of the body on each of the first and second alignment devices and the alignment slots could be located on the first and second lateral sides of the retention catch 204. Of course, in this arrangement and with respect to FIG. 6, the second portions 332, 344 of the alignment slots 325, 336 would be angled relative to the first portions 328, 340 and generally extend from a bottom of the first portions 328, 340 and toward the back of the body 224 or in a direction toward the handle 232, to provide the tilting or angling of the board retention catch 204 when handle 232 is in the open position. Further, more or fewer alignment slots and slide pins can be incorporated into the quick release mechanism 200 without departing from the spirit and scope of the invention.

During use of mechanism 200, the mechanism 200 would be mounted within a computer chassis/box proximate and adjacent a mounting surface such as a motherboard of a server or the like. The mechanism 200 would be positioned in the open position as shown in FIGS. 4-8 by operation of the handle 232 of the loading assembly 228. Then, an edge of an expansion board such as board 106 would be inserted into the slot or gap 220 between lower and upper retaining members 208, 212 in the board retention catch assembly 204. Then, as the user pushes the handle 232 into the closed configuration, first, second, third, and fourth pins 352, 356, 360, and 364 will slide in the first and second elongated alignment slots 325, 336. After the handle 232 has reached the fully closed position, the first and second pins 352, 356 will both reside in the first portion 328 of the first elongated alignment slot 325, and the third and fourth pins 360, 364 will both reside in the first portion 340 the second elongated alignment slot 336.

As will be appreciated, as the first and second dowels 312, 316 are exerting the downward force on the board retention catch 204 within the first and second elongated slots 304, 308 and thus driving the board retention catch 204 toward platform 240. The first and third pins 356, 364 will be approaching the first portions 328, 340 of the first and second elongated alignment slots 325, 336. Simultaneously, the board retention catch 204 will be shifting from an angled loading position as shown in FIGS. 4-8 into a compact loaded position as shown in FIGS. 1-3 with a retained/received expansion board being orientated in a horizontal plane or a plane that is substantially parallel to the mounting surface (e.g., a plane containing the upper surface of a motherboard or the like). The angled nature of the first and second portions 328, 332, 340, 344, of the first and second elongated alignment slots 325, 336 allows the first, second, third, and fourth pins 352, 356, 360, 364 to slide from a position whereby the first and second pins 352, 356 and the third and fourth pins 360, 364 are not vertically aligned (in the loading position) to a position whereby the first and second pins 352, 356 and the third and fourth pins 360, 364 are vertically aligned (in the loaded position). Such a configuration essentially allows the board retention catch 204 to pivot about the first and third pins 352, 360 between the loading and loaded (opened and closed) positions. Ordinary artisans will realize that the angle between the first and second portions 328, 332, 340, 344, of the first and second elongated alignment slots 324, 336, can be modified to provide a desired loading angle of the board retention catch 204. Additionally, as the board retention catch 204 is shifting from the loading to the loaded position, the connectors on the underside of the horizontal expansion board 16 are simultaneously being inserted into the spring loaded expansion sockets on the motherboard or chassis 102. Thereafter, when a user lifts handle 232 into the open configuration which simultaneously shifts the board retention catch 204 into the angled loading position, the horizontal expansion board 106 is situated in a protruded orientation from the quick release mechanism 200 which allows a user to conveniently grasp the horizontal expansion board 106 for easy removal and subsequent replacement.

With respect to FIGS. 7-8, the design of the first and second manipulation arms 236, 238 and assembly of the first and second manipulation arms 236, 238 to the handle 232 and loading area 228 of the body 224 will now be described. First manipulation arm 236 includes first, second and third portions 368, 372, 376 and second manipulation arm 238 includes first, second and third portions 380, 384, 388. Each of the second portions 372, 384 is perpendicular to its respective first and third portions 368, 376, 380, 388 such that each of the first portions, 368, 380 is offset from its respective third portion 376, 388. Also, each of the first portions 368, 380 resides in a plane that is generally parallel to a plane resided in by the third portions 376, 388. It will be appreciated that such an offset design of the various portions of the manipulation arms creates a mechanical advantage for a user of the quick release mechanism 200. More specifically, as compared to first and second manipulation arms without such an offset, a user can produce essentially the same output force at the first and second dowels 312, 316 by exerting a decreased input force at the handle 232. Ordinary artisans will also appreciate that various other manipulation arm designs can be utilized to provide a desired mechanical advantage without departing from the spirit and scope of this invention.

With particular reference to FIG. 8, the connection assembly between the first and second manipulation arms 236, 238, the body 224, and the handle 232 can be seen. Although the connection assembly involving the third pin 280 will be described, the same connection assembly is applicable to the first, second and fourth pins 272, 276, 284. The third pin 280 includes a stem 281 that can be selectively inserted through bores (not shown) in both the first upstanding tang 282 and the third portion 388 of the second manipulation arm 238. After the stem 281 is inserted through the bores, a spring pin 396 is inserted through a hole 283 in the stem 281 to lock the pin 280 within the bores. Thereafter, the third portion 388 of the second manipulation arm 238 is free to pivot about the pin 280. A washer 392 can optionally be placed over the stem 281 before insertion of the spring pin 396 to assist in smooth pivoting of the third and to distribute the load of the locking action of the spring pin 396 against the third portion 388 of the second manipulation arm 238. It will be appreciated that various other connection assemblies between the first and second manipulation arms 236, 238, the body 224 of the quick release mechanism 200 and the handle 232 can be utilized such as screw and bolt combinations, snapping features, and the like.

As can be seen from the above description, expansion board retention and extraction mechanisms fabricated according to embodiments of the invention provide a number of useful functions and provide several advantages over existing installation and retention schemes. First, the mechanisms include a positionable board retention catch with a slot for receiving an edge of an expansion board and retaining forces are applied not just at points but are applied over a relatively large surface area (e.g., a length of at least few inches or a percentage of the board edge/side length such as at least 30 to 50 percent and more typically about 70 percent or more and on the upper and lower surfaces of the board with upper and lower retaining members (such as 0.1 to 0.5 inches or more of slot or receiving channel depth), which represents a contact area of up to several square inches or more). The board retention catch is positionable in that it is mounted or supported within an elongate body or support structure that includes at least two guide grooves/slots, and the retention catch includes a pair of side members/pins that extend from the ends of the catch body into these guide grooves/slots.

The grooves or slots in the support structure may be simply vertical in some embodiments to define a loading or open position of the mechanism in which the retention catch slot/channel is positioned a first vertical distance above a mounting surface and define a mounting or closed position of the mechanism in which the retention catch slot/channel is positioned a second vertical distance (less than the first vertical distance) above the mounting surface, with the second vertical distance selected such that when an expansion board is received/retained with the slot/channel of the retention catch body then the board is mounted and/or connected within the computer or server (e.g., the first distance or height may be 1 to 3 inches or more while the second distance or height may be 0.25 to 2 inches or more but less than the first distance/height).

In other embodiments, though, these grooves or slots not only define a vertical travel path for the retention catch and retained board but also cause the catch body to move laterally and typically to cause the slot/channel to face upward to facilitate insertion and ejection of a board. To this end, the grooves or slots, which face toward each other in the support structure (e.g., across a space where the retention catch is positioned), define two travel portions or paths that are transverse to each other. In a first travel path (as measured or begun from the closed position), the pin(s) extending from the side of the retention catch are able to travel vertically/in a normal plane relative to the mounting surface or motherboard (such as for 0.5 to 1 inch or more of travel), and in a second travel path/portion, the pin(s) are able to travel at an angular offset away from the mounting surface or motherboard (e.g., in a plane that is offset but 10 to 45 degrees or more from a plane that is orthogonal or perpendicular to the mounting surface or to a mounting shelf in the support structure). In this manner, an expansion board retained within the retention catch slot/channel (during extraction/removal) is moved upward or vertically for a first distance and then laterally and, in some cases, at an angle such that the expansion board first is parallel to the mounting surface and then is moved laterally and tipped backward or away from a mounting surface to be in a plane that is transverse to the mounting surface, which facilitates ready withdrawal of the board from the retention catch. The lateral movement may be a distance that is relatively small relative to the vertical movement (such as less than 1 inch and often 0.25 to 0.5 inches or less), and, in some embodiments, at least a portion of the lateral and/or angular movement or rotation occurs concurrently with the vertical travel (e.g., such as when 2 pins are used on each side as shown in the attached figures).

One or more arms are pivotally mounted to the support structure of the expansion board retention and extraction mechanism and a handle (as shown in the figures, the handle may be provided to allow a user to apply opening and closing forces to move these arms concurrently). Each of these arms may also be attached to the board retention catch such that these arms and the handle are used to apply forces to the body of the board retention catch to cause it to move, as allowed or directed by the guide or alignment slots. The arms may be attached to the board retention catch via a pin or the like extending into a slot or groove in the body of the board retention catch, such that the arms can pivot about their mounting to the support structure while these pins slide within the slot or groove. In some cases, the slot/groove receiving the "force application" pins/members extending from the arms is in a horizontal plane that is parallel to the mounting surface within the computer chassis/box and/or to the shelf on the support structure (that receives the board retention catch in the closed position).

The above described invention, while including the preferred embodiment and the best mode of the invention known, to the inventor at the time of filing are given as illustrative examples only. It will be readily appreciated that many deviations may be made from the specific embodiments disclosed in the specification without departing from the spirit and scope of the invention. For example, the slot or channel is shown as being continuous but, in some embodiments, more than one spaced apart upper and/or lower retaining member may be utilized to provide a series of receiving channels for an edge/side of an expansion board and provide a relatively large force-application or junction area between the expansion board and the retention catch.

We claim:

1. An apparatus for retention and extraction of expansion boards within a computer chassis, comprising:
   a support assembly adapted for mounting to the computer chassis including an elongate body, the support assembly body comprising a pair of spaced apart slots on opposing portions of the support assembly body;
   a board retention catch assembly comprising a body with a pair of alignment pins extending outward from the board retention catch body and into the slots of the support assembly body, wherein the board retention catch assembly further comprises a pair of elongate retaining members extending parallel to each other on the board retention catch body and defining a retention channel therebetween for receiving an edge of an expansion board; and
   a handle assembly attached to the board retention catch body and operating to move the board retention catch body and the retaining members between a closed and an open position by applying a force to cause the alignment pins to move concurrently within the slots of the support assembly body.

2. The apparatus of claim 1, wherein the slots of the support assembly body each comprise a first portion extending substantially orthogonal to a mounting surface for the expansion board within the chassis and a second portion extending from an end of the first portion at an angular offset from normal.

3. The apparatus of claim 2, wherein the first and second portions define a travel path for the board retention catch body moving the retention channel from a closed position at a first height above the mounting surface to an open position at a second height greater than the first height and at a lateral location further spaced apart from the mounting surface.

4. The apparatus of claim 2, wherein the board retention catch body comprises an additional pair of the alignment pins such that a pair of the alignment pins extends out from two opposite sides of the board retention catch body, whereby when the board retention catch body is moved between the closed position and the open position the board retention catch body moves concurrently in a vertical direction and a lateral direction relative to the mounting surface.

5. The apparatus of claim 1, wherein the retention channel has a depth greater than about 0.2 inches, a length greater than about 50 percent of a length of the received edge of the expansion board, and a height as measured between the retaining members that is less than about a thickness of the expansion board, whereby the retaining members abuttingly engage at least an upper and a lower surface of the expansion board proximate to the received edge.

6. The apparatus of claim 1, wherein the board retention catch body comprises a pair of elongate grooves and wherein the handle assembly includes a pair of arms pivotally mounted to the support assembly body, each of the arms including a force-application member extending outward from the arm into the grooves of the board retention catch body, whereby the handle assembly is operated to move the board retention catch body by pivoting the arms to apply forces to the board retention catch body via mating surface between the grooves and the force-application members.

7. The apparatus of claim 6, further comprising at least one resilient member for applying a spring force upon a surface of the board retention catch body to assist movement from the closed to the open position and to resist movement from open to the closed position.

8. A mechanism for effecting toolless loading and unloading of an expansion board from a computing device, the mechanism comprising:
   an elongated body including first and second mounting zones and a recessed surface between the first and second mounting zones, the recessed surface including a platform;
   a retention catch adapted to receive the expansion board and to be received within the recessed surface of the elongated body; and
   a handle assembly movable between open and closed configurations; wherein the handle assembly positions the retention catch at a first angle to the platform in the open configuration and at a second angle to the platform in the closed configuration, the first angle being different than the second angle.

9. The quick release mechanism as recited in claim 8, further comprising:
   a dowel extending from the handle assembly; and
   an elongated slot located within the retention catch and respectively adapted to selectively receive the dowel; wherein when the dowel is located within the elongated slot, movement of the handle assembly between the closed and open configurations will cause the dowel to exert a driving force on the inside of the elongated slot to load or unload an expansion board from the quick release mechanism.

10. The quick release mechanism as recited in claim 9, further comprising:
    a pair of pins attached to a surface of the retention catch; and
    an alignment slot on the elongated body and adapted to selectively receive the pair of pins;
    wherein movement of the pair of pins within the alignment slot assists in causing the retention catch to be positioned between the first and second angles.

11. The quick release mechanism as recited in claim 10, further comprising:
    first and second pegs extending from the retention catch; and
    a first and second springs extending from the recessed surface of the loading area; whereby when the first and second pegs are respectively situated within the first and second springs, movement of the handle assembly from the open to the closed configuration compresses the first and second springs.

12. The quick release mechanism as recited in claim 8, further comprising:
    a pair of pins attached to a surface of the retention catch; and
    an alignment slot on the elongated body and adapted to selectively receive the pair of pins;
    wherein movement of the pair of pins within the alignment slot assists in causing the retention catch to be positioned between the first and second angles.

13. The quick release mechanism as recited in claim 12, wherein the alignment slot includes first and second portions angled relative to each other; wherein when the retention catch is at the second angle to the platform in the closed configuration of the handle assembly, the pair of pins is located within the first portion of the alignment slot; and wherein when the retention catch is at the first angle to the platform in the open configuration of the handle assembly, one pin of the pair of pins is located within the first portion of the alignment slot and the other pin of the pair of pins is located within the second portion of the alignment slot.

14. The quick release mechanism as recited in claim 8, wherein the handle assembly comprises first and second manipulation arms and a handle; wherein a first portion of each of the first and second manipulation arms is pivotally connected to the elongated body and a second portion of each of the first and second manipulation arms is pivotally connected to the handle.

15. A system for retention and extraction of an expansion board, the system comprising:
    a computer chassis; and
    a retention and extraction mechanism mounted to the computer chassis, the mechanism comprising:
      a gripping device having at least one elongated retention slot for accepting a portion of the expansion board;
      a body adapted to selectively receive the gripping device; and
      an element for moving the gripping device between a first position wherein the gripping device is adjacent to a portion of the body and a second position wherein the gripping device is spaced from the portion of the body.

16. The system as recited in claim 15, wherein the gripping device moves in at least two dimensions when moving between the first and second positions.

17. The system as recited in claim 15, wherein the moving element comprises an arm pivotally connected to the body and a driving member extending from the arm; wherein when the gripping device is received in the body, the driving member is adapted to drive the gripping device between the first and second positions.

18. The system as recited in claim 17, wherein the gripping device includes an elongated slot for accepting the driving member when the gripping device is received by the body.

19. The system as recited in claim 15, wherein the body or the gripping device comprises an alignment slot with first and second portions angled to each other, and the other of the body or the gripping device includes a pair of protrusions that is adapted to slide within the alignment slot, wherein when the moving element moves the gripping device between the first and second positions, the interaction of the pair of protrusions and the alignment slot rotates the gripping device such that the gripping device is generally perpendicular to the portion of the body in the first position and generally not perpendicular to the portion of the body in the second position.

20. The system as recited in claim 15, wherein the body or the gripping device comprises a peg and the other of the body or the gripping device comprises a spring; wherein when the gripping device is received by the body and the moving element moves the gripping device from the second position to the first position, the peg interacts with the spring and the spring is compressed between the gripping device and the body to store potential energy for later assisting in movement of the gripping device from the first to the second position.

* * * * *

UNITED STATES PATENT AND TRADEMARK OFFICE
CERTIFICATE OF CORRECTION

| | |
|---|---|
| PATENT NO. | : 8,050,052 B2 |
| APPLICATION NO. | : 12/325431 |
| DATED | : November 1, 2011 |
| INVENTOR(S) | : An-Sheng Anson Zheng, Michael T. Milo and Brett C. Ong |

It is certified that error appears in the above-identified patent and that said Letters Patent is hereby corrected as shown below:

At Column 2, line 40, please delete the words "an of"

Signed and Sealed this
Sixth Day of December, 2011

David J. Kappos
*Director of the United States Patent and Trademark Office*